(12) United States Patent
Ford, III et al.

(10) Patent No.: US 12,135,936 B2
(45) Date of Patent: Nov. 5, 2024

(54) SYSTEMS AND METHODS FOR NATURAL LANGUAGE PROCESSING

(71) Applicant: Capital One Services, LLC, McLean, VA (US)

(72) Inventors: Joseph Ford, III, Manakin Sabot, VA (US); Cody Stancil, Glen Allen, VA (US); Xiaowen Zhang, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 335 days.

(21) Appl. No.: 17/337,792

(22) Filed: Jun. 3, 2021

(65) Prior Publication Data

US 2022/0391583 A1    Dec. 8, 2022

(51) Int. Cl.
*G06F 40/20* (2020.01)
*G06F 18/214* (2023.01)
*G06N 20/20* (2019.01)

(52) U.S. Cl.
CPC .......... *G06F 40/20* (2020.01); *G06F 18/2148* (2023.01); *G06F 18/2155* (2023.01); *G06N 20/20* (2019.01)

(58) Field of Classification Search
CPC .. G06F 40/20; G06F 18/2148; G06F 18/2155; G06N 20/20
See application file for complete search history.

(56) References Cited

U.S. PATENT DOCUMENTS

| 10,861,439 | B2  |   | 12/2020 | Doyle et al. |           |
|------------|-----|---|---------|---------------|-----------|
| 2020/0162312 | A1 | * | 5/2020  | Balasubramanian | G06N 5/022 |
| 2022/0036134 | A1 | * | 2/2022  | Bali          | G06N 20/00 |
| 2022/0083580 | A1 | * | 3/2022  | Yamamoto      | G06F 16/35 |
| 2022/0245378 | A1 | * | 8/2022  | Bradley, III  | G06F 18/217 |

* cited by examiner

*Primary Examiner* — Daniel C Washburn
*Assistant Examiner* — Athar N Pasha
(74) *Attorney, Agent, or Firm* — TROUTMAN PEPPER HAMILTON SANDERS LLP; Christopher J. Forstner; John A. Morrissett (57) ABSTRACT

Disclosed embodiments may include a method that may include receiving a corpus of unlabeled text documents, generating, using the first machine learning model, a first classification of each unlabeled text document in the corpus of unlabeled text documents as positive or negative, defining, using the first machine learning model and based on the first classification, a first subset of the unlabeled text documents and a second subset of the unlabeled text documents, generating, using the second machine learning model, a second classification of each unlabeled text document in the first subset of the unlabeled text documents as positive or negative, generating, using the third machine learning model, a third classification of each unlabeled text document in the second subset of the unlabeled text documents as positive or negative, and modifying the first classification, based on the second classification and the third classification, to create a fourth classification.

20 Claims, 4 Drawing Sheets

SYSTEMS AND METHODS FOR NATURAL LANGUAGE PROCESSING

FIELD

The disclosed technology relates to systems and methods for improving natural language processing. In particular, the disclosed technology relates to modifying a classification of text documents based on classifying the one or more subsets of text documents defined by the first classification.

BACKGROUND

Classifying documents using existing Natural Language Processing (NLP) models has limitations. A given word or phrase may have different meanings in different contexts, but existing NLP models do not take different contexts into account, thereby reducing their accuracy. This is particularly impactful to modeling efforts when a certain word or phrase related to a classification is a contranym or homonym to something with little relation to the classification.

Accordingly, there is a need for improving the accuracy of NLP classification models by taking context of a subpopulation into account when classifying text. Embodiments of the present disclosure are directed to this and other considerations.

SUMMARY

Disclosed embodiments may include a system for improving NLP. The system may include one or more first processors, and memory in communication with the one or more processors and storing first instructions that are configured to cause the system to perform a method for improving natural language processing. For example, the system may receive a corpus of labeled text documents, train a first machine learning model based on the labeled text documents, train a second machine learning model based on a first subset of the labeled text documents, and train a third machine learning model based on a second subset of the labeled text documents. The system may also receive a corpus of unlabeled text documents and generate, using the first machine learning model, a first classification of each unlabeled text document in the corpus of unlabeled text documents as positive or negative. The system may define, using the first machine learning model and based on the first classification, a first subset of the unlabeled text documents and a second subset of the unlabeled text documents and generate, using the second machine learning model, a second classification of each unlabeled text document in the first subset of the unlabeled text documents as positive or negative. The system may generate, using the third machine learning model, a third classification of each unlabeled text document in the second subset of the unlabeled text documents as positive or negative and modify the first classification based on the second classification and the third classification to create a fourth classification. The fourth classification may be a combination of the first and second classifications and first and third classifications in tandem across an entire set of text documents.

Disclosed embodiments may include another system for improving NLP. The system may include one or more processors, memory in communication with the one or more processors and storing first instructions that are configured to cause the system to perform a method for improving NLP. For example, the system may receive a corpus of unlabeled text documents, generate, using a trained first machine learning model, a first classification of each unlabeled text document in the corpus of unlabeled text documents as positive or negative, and define, using the trained first machine learning model and based on the first classification, a first subset of the unlabeled text documents and a second subset of the unlabeled text documents. The system may generate, using a trained second machine learning model, a second classification of each unlabeled text document in the first subset of the unlabeled text documents as positive or negative, generate, using a trained third machine learning model, a third classification of each unlabeled text document in the second subset of the unlabeled text documents as positive or negative, and modify the first classification, based on the second classification and the third classification, to create a fourth classification.

Disclosed embodiments may include a computer-implemented method for improving natural language processing. The method may include receiving a corpus of unlabeled text documents, generating using a trained first machine learning model, a first classification of each unlabeled text document in the corpus of unlabeled text documents as positive, or negative, and defining using the trained first machine learning model and based on the first classification, a first subset of the unlabeled text documents and a second subset of the unlabeled text documents. The method may also include generating, using a trained second machine learning model, a second classification of each unlabeled text document in the first subset of the unlabeled text documents as positive or negative, generating, using a trained third machine learning model, a third classification of each unlabeled text document in the second subset of the unlabeled text documents positive or negative, and modifying the first classification, based on the second classification and the third classification, to create a fourth classification.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate generally to classifying text documents, more particularly, to systems and methods for revising the classification of text documents based on classifying subsets of the text documents. The systems and methods described herein are necessarily rooted in computer technology as they relate to classifying text documents and defining subsets of text documents using machine learning models. Machine learning models are a unique computer technology that involves training the models to complete a task, such as classification by feeding the models with labeled or classified text documents (training documents) so they learn how to classify the training documents and apply the same classification techniques to unlabeled text documents. Importantly, examples of the present disclosure improve the speed with which computers can classify documents by taking context of the document/words into account due to improvements in machine learning and techniques for training the machine learning models.

Moreover, existing NLP models may have limitations in accurately classifying text documents especially when words found within a corpus of documents may change their meaning. Take, for example, the word "bad" in product reviews. In a large corpus, "bad" typically would be associated with a poor product review (e.g., "this is a bad product"). However, when looking at just the positive reviews, the word "bad" may mean good (e.g., "this product is a bad mamma jamma"). And when looking at the negative reviews, the word "bad" would mean not good. The present system can correct for this using three machine learning models with a first machine learning model trained to classify an entire corpus and two additional machine learning models trained to refine the overall classification by only classifying subsets of the entire corpus that are defined by the first machine learning model. That way, the two additional machine learning models learn how words affect a classification of text within smaller populations where the meaning of a word may change.

It is envisioned that more than three machine learning models may be used. For example, the second and third machine learning models described above may each have two additional machine learning models to further reclassify the positive and negative classification that the second and third machine learning models generate.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
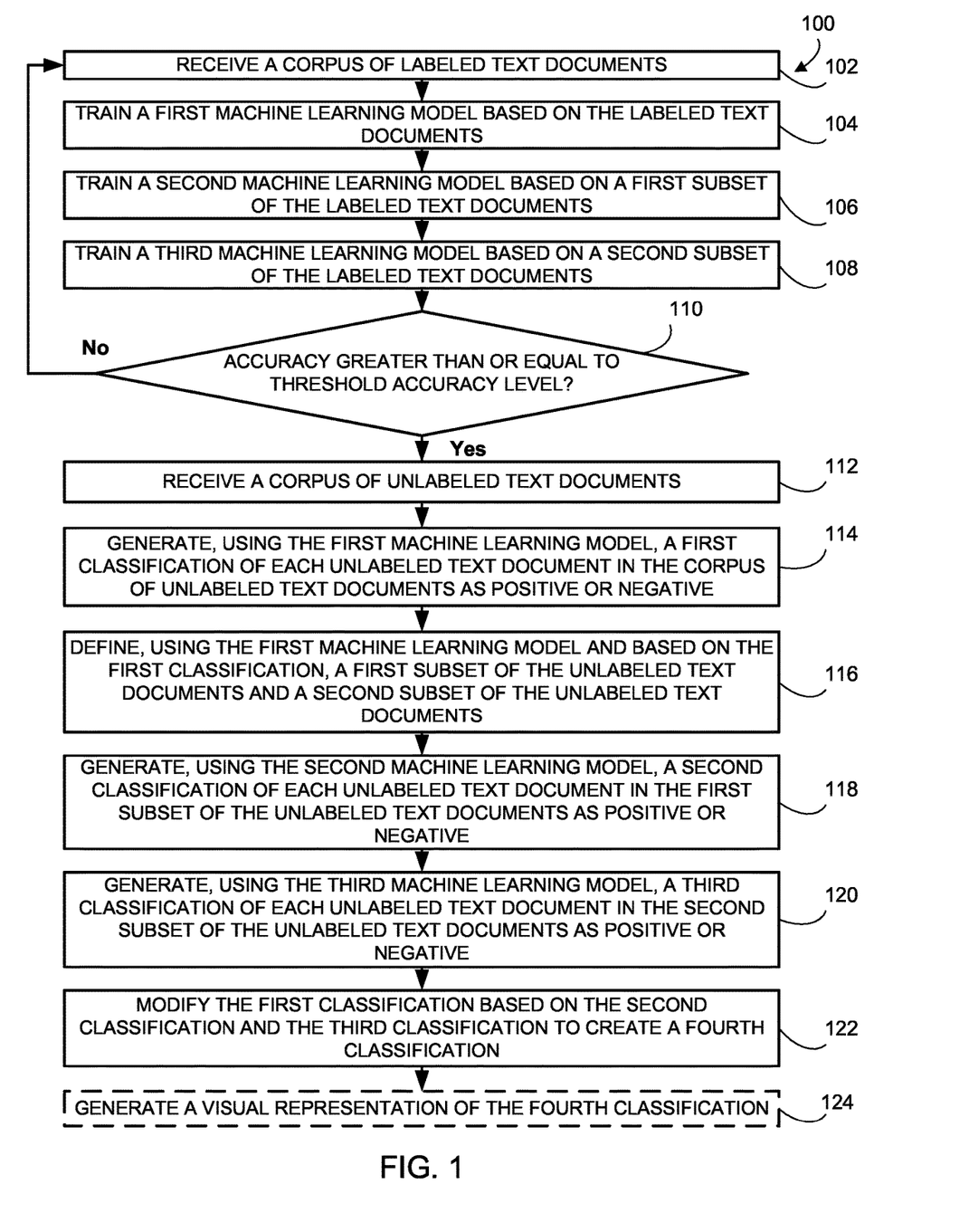
FIG. 1 is a flow diagram illustrating an exemplary method for training and utilizing multiple machine learning models to improve natural language processing of text documents, in accordance with certain embodiments of the disclosed technology.

FIG. 1 is a flow diagram illustrating an exemplary method 100 for training and utilizing multiple machine learning models to improve natural language processing of text documents, in accordance with certain embodiments of the disclosed technology. The steps of method 100 may be performed by one or more components of the system 300 (e.g., document classification system 320 of a natural language processing system 408 or user device 402), as described in more detail with respect to FIGS. 3 and 4.

In block 102, the document classification system 320 may receive a corpus of labeled text documents. These training documents are pre-labeled with various categories. For example, the labeled text documents may be online reviews of a product and the text document or reviews may be labeled good or bad.

In block 104, the document classification system 320 may train a first machine learning model based on the labeled text documents. As an example, the first machine learning model, of which any applicable NLP technique (or combinations of NLP techniques) may be used (e.g., Naïve Bayes, term frequency-inverse document frequency (TF-IDF) using gradient boosting machine (GBM), bidirectional encoder representations from transformers (BERT), etc.), of the document classification system 320 may learn to recognize which terms associate a product review with a bad review and a good review. For example, for a large number of reviews (e.g., >1000 reviews), the term "bad" may be associated with bad product reviews. In block 106, the document classification system 320 may train a second machine learning model based on a first subset of the labeled text documents. If the second machine learning model trains on a more limited subset, such as 500 prelabeled positive reviews, the second machine learning model, of which any applicable NLP technique (or combinations of NLP techniques) may be used (e.g., Naïve Bayes, TF-IDF using GBM, BERT, etc.) may learn to associate the term "bad" as an indicator of a positive review in some cases (e.g., "the product is a bad mamma jamma"). The second machine learning model may be the same as, or different, from the first machine learning model. For example, the first and second machine learning models may both be machine learning models, including TF-IDF using GBM NLP techniques or the first machine learning model may include the Naïve Bayes NLP technique and the second machine learning model may include a TF-IDF using GBM NLP technique.

In block 108, the document classification system 320 may train a third machine learning model based on a second subset of the labeled text documents. For example, the document classification system 320 may train the third machine learning model based on 500 prelabeled negative reviews. The third machine learning model may recognize the use of the term "bad" in context of other words that indicate a negative product review. The third machine learning model may include a TF-IDF naive Bayes model or a TF-IDF GBM model, or combinations thereof.

In block 110, the document classification system 320 may determine whether the accuracy of the first, second, and third machine learning models is sufficient to accurately classify the labeled text documents within a threshold accuracy level (e.g., 90%). That is, the document classification system 320 may determine whether the first, second, and third machine learning models accurately classify text documents greater than, or equal to, the threshold accuracy level. To accomplish this, the document classification system 320 may generate predicted classifications of the labeled text documents from the first, second, and third machine learning models and compare the predicted classifications with the actual classification of the labeled text documents. When the document classification system 320 determines that the accuracy of the predicted classifications exceeds or is equal to the accuracy threshold, then the document classification system 320 continues to block 112 described below. However, if the accuracy of the predicted classifications does not equal or exceed the accuracy threshold, then the document classification system 320 may repeat blocks 102, 104, 106, and 110 until the predicted classification accuracy meets, or exceeds, the threshold accuracy level, The threshold accuracy level can be defined and/or modified, altered, or changed. In other embodiments, the document classification system 320 may repeat blocks 102, 104, 106, and 110 until there is no further improvement in accuracy or there is no additional information available to be identified from the labeled text documents.

In block 112, the document classification system 320 may receive a corpus of unlabeled text documents. These text documents may be product reviews, tweets, company reviews, and/or naturally derived text, such as service notes.

In block 114, the document classification system 320 may generate, using the first machine learning model, a first classification of each unlabeled text document in the corpus of unlabeled text documents. The first classification may be positive or negative.

In block 116, the document classification system 320 may define, using the first machine learning model and based on the first classification, a first subset of the unlabeled text documents and a second subset of the unlabeled text documents. The first subset of unlabeled text documents may be the unlabeled documents classified as negative (e.g., predicted negative product reviews) in the corpus of unlabeled text documents. The second subset of unlabeled text documents may be the unlabeled documents classified as positive (e.g., predicted positive reviews) in the corpus of unlabeled text documents.

In block 118, the document classification system 320 may generate, using the second machine learning model, a second classification of each unlabeled text document in the first subset of unlabeled text documents. The second classification may be positive or negative.

In block 120, the document classification system 320 may generate, using the third machine learning model, a third classification of each unlabeled text document in the second subset of unlabeled text documents. The third classification may be positive or negative.

In block 122, the document classification system 320 may modify the first classification, based on the second classification and/or based on the third classification, to create a fourth classification. The document classification system 320 may compare the first and second classifications of each unlabeled text document of the first subset to determine whether the first and second classifications differ. If the first and second classifications differ for any unlabeled text document of the first subset, the document classification system 320 will use the second classification for the fourth classification. Similarly, the document classification system 320 may compare the first and third classifications of each unlabeled text document of the second subset to determine whether the first and third classifications differ. If the first and third classifications differ for any unlabeled text document of the second subset, the document classification system 320 will use the third classification for the fourth classification.

In optional block 122, the document classification system 320 may generate a visual representation (e.g., confusion matrix) of the fourth classification. This visual representation may be transmitted to a user device 402 and cause the user device to display the visual representation.

Figure 2:
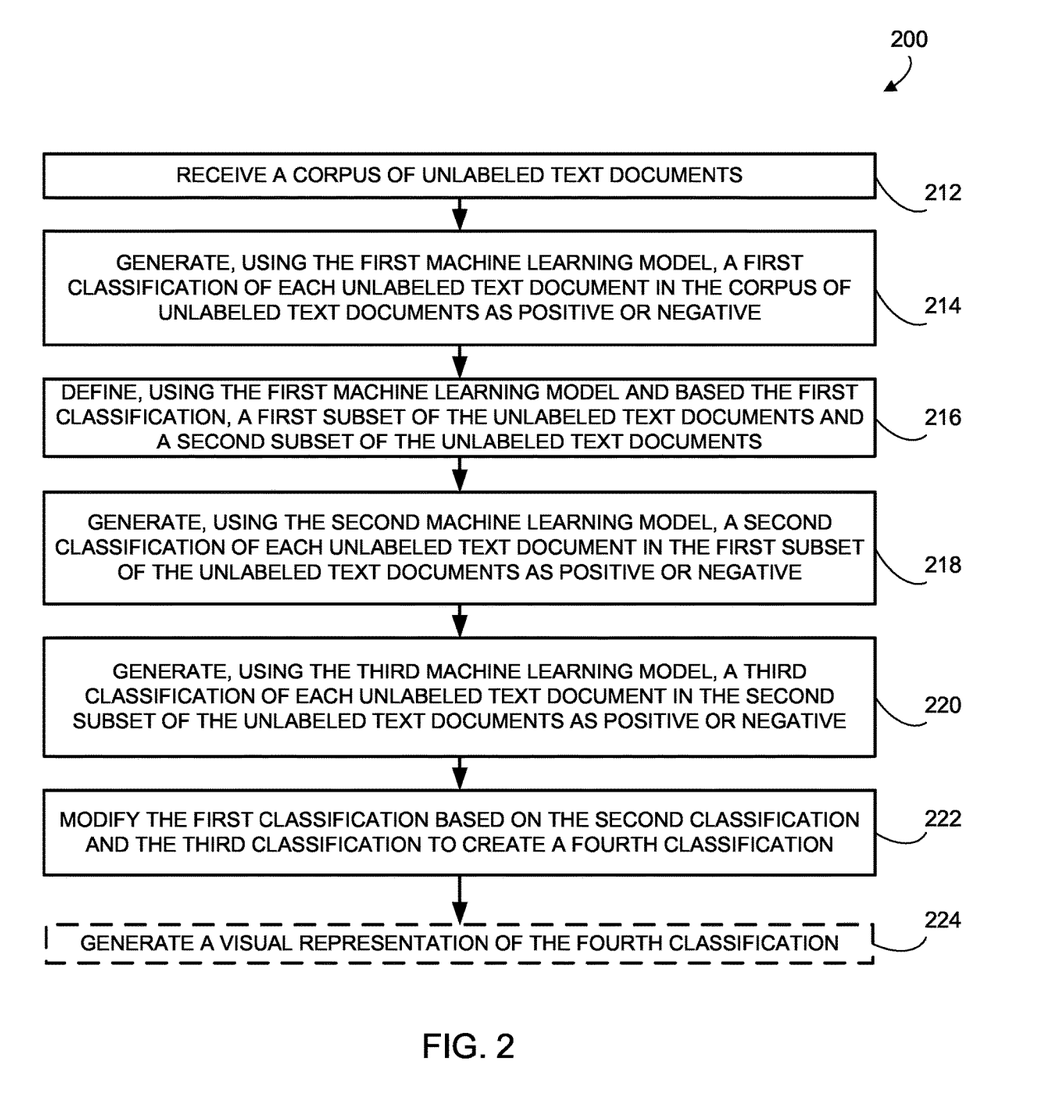
FIG. 2 is a flow diagram illustrating an exemplary method for utilizing multiple machine learning models to improve natural language processing of text documents, in accordance with certain embodiments of the disclosed technology.

FIG. 2 is a flow diagram illustrating an exemplary method for utilizing multiple machine learning models to improve natural language processing of text documents, in accordance with certain embodiments of the disclosed technology. The steps of method 200 may be performed by one or more components of the system 400 (e.g., document classification system 320 of a natural language processing system 408, user device 402), as described in more detail with respect to FIGS. 3 and 4.

Method 200 of FIG. 2 is similar to method 100 of FIG. 1, except that method 200 may not include blocks equivalent or similar to blocks 102, 104, 106, and 108 of method 100. The descriptions of blocks 212, 214, 216, 218, 220, 222, and 224 in method 200 are similar to the respective descriptions of blocks 112, 114, 116, 118, 120, 122, and 124 of method 100 and are not repeated herein for brevity.

Figure 3:
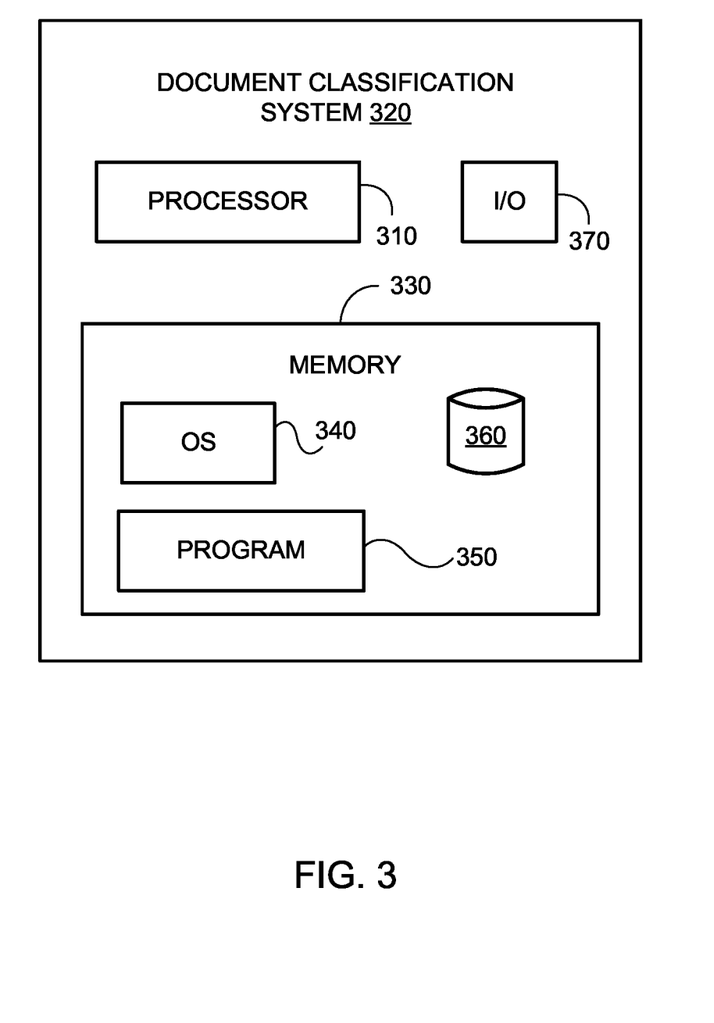
FIG. 3 is a block diagram of an example document classification system used to classify text documents, according to an example implementation of the disclosed technology.
Figure 4:
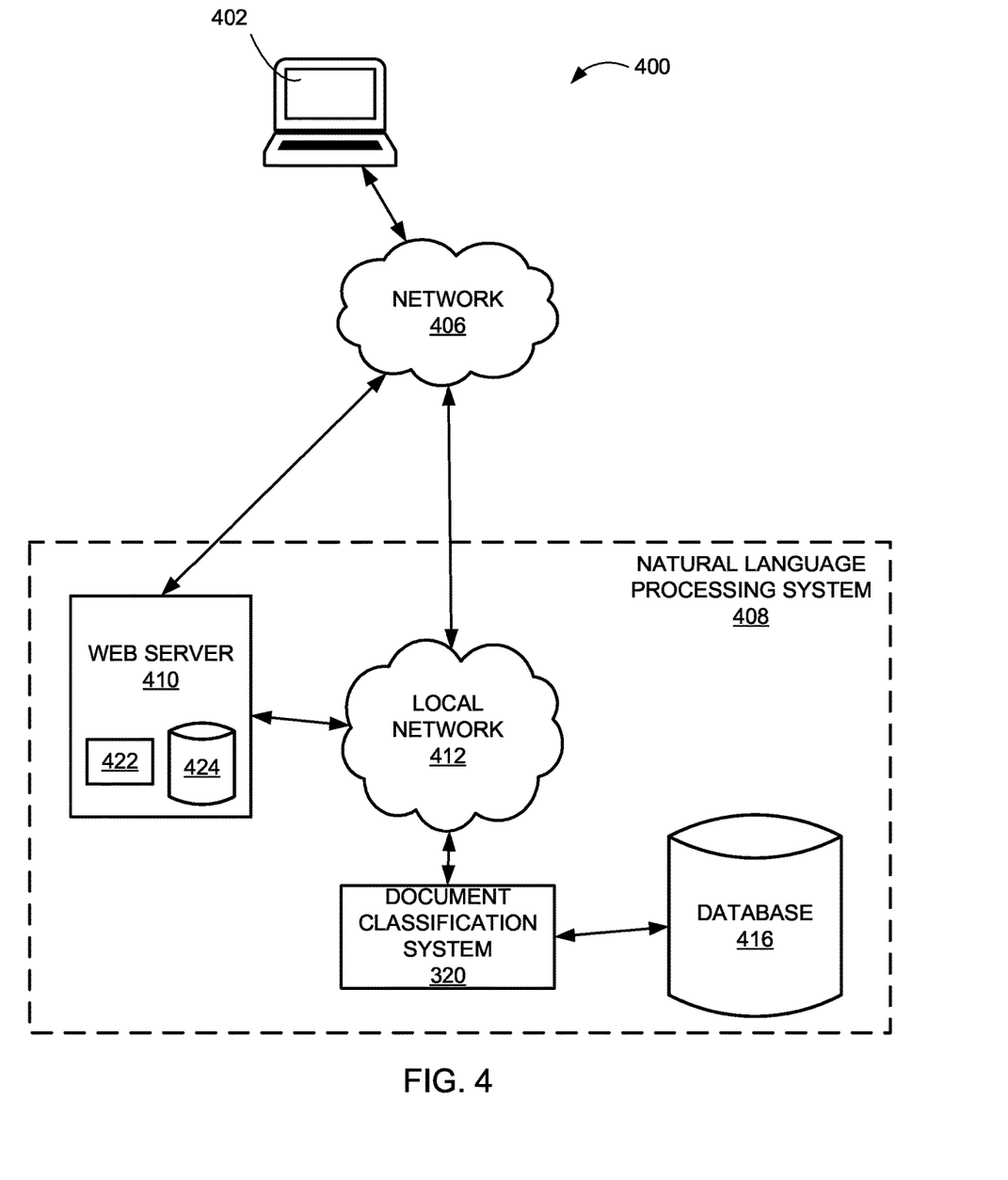
FIG. 4 is a block diagram of an example system that may be used to classify text documents, according to an example implementation of the disclosed technology.

FIG. 3 is a block diagram of an example document classification system 320 used to classify text documents, according to an example implementation of the disclosed technology. According to some embodiments, the user device 402 and document classification system 420, as depicted in FIG. 4 and described below, may have a similar structure and components that are similar to those described with respect to document classification system 320 shown in FIG. 3. As shown, the document classification system 320 may include a processor 310, an input/output ("I/O") device 370, a memory 330 containing an operating system ("OS") 340 and a program 350. In certain example implementations, the document classification system 320 may be a single server or may be configured as a distributed computer system including multiple servers or computers that interoperate to perform one or more of the processes and functionalities associated with the disclosed embodiments. In some embodiments, the document classification system 320 may further include a peripheral interface, a transceiver, a mobile network interface in communication with the processor 310, a bus configured to facilitate communication between the various components of the document classification system 320, and a power source configured to power one or more components of the document classification system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Pentium™ family manufactured by Intel™ or the Turion™ family manufactured by AMD™. The processor 310 may constitute a single core or multiple core processor that executes parallel processes simultaneously. For example, the processor 310 may be a single core processor that is configured with virtual processing technologies. In certain embodiments, the processor 310 may use logical processors to simultaneously execute and control multiple processes. The processor 310 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the document classification system 320 may include one or more storage devices configured to store information used by the processor 310 (or other components) to perform certain functions related to the disclosed embodiments. In one example, the document classification system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the document classification system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the document classification system 320 may include the memory 330 that may include one or more programs 350 to perform one or more functions of the disclosed embodiments. For example, in some embodiments, the document classification system 320 may additionally manage dialogue and/or other interactions with the customer via a program 350.

The processor 310 may execute one or more programs located remotely from the document classification system 320. For example, the verification system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a document classification database 360 for storing related data to enable the document classification system 320 to perform one or more of the processes and functionalities associated with the disclosed embodiments.

The document classification database 360 may include stored data relating to in-person status credentials, time data related to when a link was generated, and count data related to how may in-person status requests the document classification system 320 has received per generated link. According to some embodiments, the functions provided by the document classification database 360 may also be provided by a database that is external to the document classification system 320, such as the database 416 as shown in FIG. 4.

The document classification system 320 may also be communicatively connected to one or more memory devices (e.g., databases) locally or through a network. The remote memory devices may be configured to store information and may be accessed and/or managed by the verification system 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The document classification system 320 may also include one or more I/O devices 370 that may comprise one or more interfaces for receiving signals or input from devices and providing signals or output to one or more devices that allow data to be received and/or transmitted by the document classification system 320. For example, the document classification system 320 may include interface components, which may provide interfaces to one or more input devices, such as one or more keyboards, mouse devices, touch screens, track pads, trackballs, scroll wheels, digital cameras, microphones, sensors, and the like, that enable the document classification system 320 to receive data from a user (such as, for example, via the user device 402).

In example embodiments of the disclosed technology, the document classification system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the document classification system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the document classification system 320 may include a greater or lesser number of components than those illustrated.

FIG. 4 is a block diagram of an example system that may be used for training and utilizing multiple machine learning models to improve natural language processing of text documents, according to an example implementation of the disclosed technology. The components and arrangements shown in FIG. 4 are not intended to limit the disclosed embodiments as the components used to implement the disclosed processes and features may vary. As shown, natural language processing system 408 may interact with a user device 402 via a network 406. In certain example implementations, the natural language processing system 408 may include a local network 412, a document classification system 420, and a database 416.

In some embodiments, a user may operate the user device 402. The user device 402 can include one or more of a mobile device, smart phone, general purpose computer, tablet computer, laptop computer, telephone, PSTN landline, smart wearable device, voice command device, other mobile computing device, or any other device capable of communicating with the network 406 and ultimately communicating with one or more components of the natural language processing system 408. In some embodiments, the user device 402 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the natural language processing system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network using a public network, and/or other suitable connection(s) that enable(s) components in the system 400 environment to send and receive information between the components of the system 400. The network 406 may also include a public switched telephone network ("PSTN") and/or a wireless network.

The natural language processing system 408 may be associated with and optionally controlled by one or more entities such as a business, corporation, individual, partnership, or any other entity that provides one or more of goods, services, and consultations to individuals such as customers. The natural language processing system 408 may include one or more servers and computer systems for performing one or more functions associated with products and/or services that the organization provides.

The local network 412 may include any type of computer networking arrangement used to exchange data in a localized area, such as WiFi, Bluetooth™ Ethernet, and other suitable network connections that enable components of the natural language processing system 408 to interact with one another and to connect to the network 406 for interacting with components in the system 400 environment. In some embodiments, the local network 412 may include an interface for communicating with or linking to the network 406. In other embodiments, certain components of the natural language processing system 408 may communicate via the network 406, without a separate local network 406.

In accordance with certain example implementations of the disclosed technology, the natural language processing system 408 may include one or more computer systems configured to compile data from a plurality of sources the document classification system 320 and/or the database 416. The document classification system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, and business operations. For example, database 416 may include tweets, product reviews, company reviews, etc. The database 416 may also serve as a back-up storage device and may contain data and information that is also stored on, for example, database 360, as discussed with reference to FIG. 3.

Exemplary Use Cases

A document classification system 320 may be used to classify product review such as televisions. Prior to classifying new product reviews for televisions, the document classification system 320 may train three machine learning models each using a TF-IDF approach combined with GBM with training data on product reviews labeled as positive reviews or negative reviews. The document classification system 320 feeds the full labeled training data of product reviews to a first machine learning model, which learns key words that in the overall training data set of product reviews, the word "bad" may be associated with a negative product review. Next, the document classification system 320 may feed a subset of the training data (e.g., 100 positive product reviews including some positive reviews using the word "bad" to mean good such a "this television is a bad mamma jamma") to a second machine learning model, which learns where the word "bad" may be associated with positive product reviews under the right context. Additionally, the document classification system 320 may feed another subset of the training data (e.g., 900 negative product reviews including reviews using the word "bad" such as "this television is bad") to a third machine learning model, which learns to associate the word "bad" with negative reviews based on the right context. This process may be repeated using additional training data until the three machine learning models achieve a threshold accuracy level (e.g., 90% accurate) or there is no additional information available to be identified from the data. Once the document classification system 320 trains the three (or more) machine learning models to an acceptable accuracy level, it may be used on unlabeled data such as television product reviews that are not previously labeled as positive or negative reviews.

The document classification system 320 may receive 100,000 television product reviews, which it feeds to the first machine learning model. The first machine learning model classifies the 100,000 product reviews as 90,000 positive and 10,0000 negative reviews. This first classification defines the two subpopulations for the second and third machine learning models. The document classification system 320 feeds the second machine learning model with the 10,000 negative reviews classified by the first machine learning model, which reclassifies 100 of the 10,0000 negative reviews as positive reviews based on its training. The document classification system 320 feeds the third machine learning model with 90,000 positive reviews classified by the first machine learning model, which reclassified 1,000 of the 90,000 positive reviews as negative reviews based on its training.

The document classification system 320 may compare the first classification by the first machine learning model with the second classification from the second machine learning model and the third classification from the third machine learning model. When the classifications of a particular review differs, the document classification system 320 may modify or use the classification from the second and third machine learning models over the classification from the first machine learning model. Thus, the document classification system 320 may generate a master classification, or a fourth classification, system that uses and/or combines the second and third classifications rather than the first classification. The document classification system may generate a visual representation (e.g., a confusion matrix) of the master classification and transmit that visual representation to user device 402 for display.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for improving natural language processing, comprising:
   one or more processors; and
   memory in communication with the one or more processors and storing instructions that are configured to cause the system to:

receive a corpus of labeled text documents;
train a first machine learning model based on the labeled text documents;
train a second machine learning model based on a first subset of the labeled text documents;
train a third machine learning model based on a second subset of the labeled text documents;
receive a set of text documents;
generate, using the first machine learning model, a first classification of each text document in the set of text documents as positive or negative to define: (i) a first subset of text documents that comprise a first portion of the set of text documents that have a first classification that is positive and (ii) a second subset of text documents that comprise a second portion of the set of text documents that have a first classification that is negative;
generate, using the second machine learning model, a second classification of each text document in the first subset of text documents as positive or negative;
generate, using the third machine learning model, a third classification of each text document in the second subset of text documents as positive or negative; and
modify the first classification of one or more text documents of the set of text documents, based on the second classification and the third classification, to create a fourth classification by:
when the second classification of one or more text documents in the first subset of text documents is negative, replacing the first classification of the one or more text documents in the first subset of text documents with the second classification to change a positive classification associated with the one or more text documents in the first subset of text documents to be a negative classification; and
when the third classification of one or more text documents in the second subset of text documents is positive, replacing the first classification of the one or more text documents in the second subset of text documents with the third classification to change a negative classification associated with the one or more text documents in the second subset of text documents to be a positive classification;
wherein the first machine learning model comprises naïve bayes model, and
wherein the second machine learning model comprises a term frequency-inverse document frequency (TF-IDF) gradient boosting machine (GBM) model.

2. The system of claim 1, wherein the memory stores further instructions that are configured to cause the system to generate a visual representation of the fourth classification.

3. The system of claim 2, wherein the memory stores further instructions that are configured to cause the system to transmit the visual representation of the fourth classification to a user device and cause the user device to display the visual representation.

4. The system of claim 2, wherein the visual representation of the fourth classification comprises a confusion matrix.

5. The system of claim 1, wherein the third machine learning model comprises the naïve bayes model, the TF-IDF GBM model, or combinations thereof.

6. The system of claim 1, wherein one or more of the first machine learning model, the second machine learning model and the third machine learning model are trained to accurately classify the labeled text documents within a threshold accuracy level.

7. The system of claim 6, wherein the threshold accuracy level comprises 90%.

8. A system for improving natural language processing, comprising:
one or more processors; and
memory in communication with the one or more processors and storing instructions that are configured to cause the system to:
receive a set of text documents;
generate, using a trained first machine learning model, a first classification of each text document in the set of text documents as positive or negative to define: (i) a first subset of text documents that comprise a first portion of the set of text documents that have a first classification that is positive and (ii) a second subset of text documents that comprise a second portion of the set of text documents that have a first classification that is negative;
generate, using a trained second machine learning model, a second classification of each text document in the first subset of text documents as positive or negative;
generate, using a trained third machine learning model, a third classification of each text document in the second subset of text documents as positive or negative; and
modify the first classification of one or more text documents of the set of text documents, based on the second classification and the third classification, to create a fourth classification by:
when the second classification of one or more text documents in the first subset of text documents is negative, replacing the first classification of the one or more text documents in the first subset of text documents with the second classification to change a positive classification associated with the one or more text documents in the first subset of text documents to be a negative classification; and
when the third classification of one or more text documents in the second subset of text documents is positive, replacing the first classification of the one or more text documents in the second subset of text documents with the third classification, to change a negative classification associated with the one or more text documents in the second subset of text documents to be a positive classification;
wherein the first machine learning model comprises naïve bayes model, and
wherein the second machine learning model comprises a term frequency-inverse document frequency (TF-IDF) gradient boosting machine (GBM) model.

9. The system of claim 8, wherein the memory stores further instructions that are configured to cause the system to generate a visual representation of the fourth classification.

10. The system of claim 9, wherein the memory stores further instructions that are configured to cause the system to transmit the visual representation of the fourth classification to a user device and cause the user device to display the visual representation.

11. The system of claim 9, wherein the visual representation of the fourth classification comprises a confusion matrix.

12. The system of claim 8, wherein the trained third machine learning model comprises the naïve bayes model, the TF-IDF GBM model, or combinations thereof.

13. The system of claim 8, wherein one or more of the trained first machine learning model, the trained second machine learning model and the trained third machine learning model are trained to accurately classify text documents within a threshold accuracy level.

14. The system of claim 13, wherein the threshold accuracy level comprises 90%.

15. A computer-implemented method for improving natural language processing, comprising:
 receiving a set of text documents;
 generating using a trained first machine learning model, a first classification of each text document in the set of text documents as positive, or negative to define: (i) a first subset of text documents that comprise a first portion of the set of text documents that have a first classification that is positive and (ii) a second subset of text documents that comprise a second portion of the set of text documents that have a first classification that is negative;
 generating, using a trained second machine learning model, a second classification of each text document in the first subset of text documents as positive or negative;
 generating, using a trained third machine learning model, a third classification of each text document in the second subset of text documents positive or negative; and
 modifying the first classification of one or more text documents of the set of text documents, based on the second classification and the third classification, to create a fourth classification by:
  when the second classification of one or more text documents in the first subset of text documents is negative, replacing the first classification of the one or more text documents in the first subset of text documents with the second classification to change a positive classification associated with the one or more text documents in the first subset of text documents to be a negative classification; and
  when the third classification of one or more text documents in the second subset of text documents is positive, replacing the first classification of the one or more text documents in the second subset of text documents with the third classification to change a negative classification associated with the one or more text documents in the second subset of text documents to be a positive classification;
 wherein the first machine learning model comprises naïve bayes model, and
 wherein the second machine learning model comprises a term frequency-inverse document frequency (TF-IDF) gradient boosting machine (GBM) model.

16. The computer-implemented method of claim 15, further comprising generating a visual representation of the fourth classification.

17. The computer-implemented method of claim 16, further comprising:
 transmitting the visual representation of the fourth classification to a user device; and
 causing the user device to display the visual representation.

18. The computer-implemented method of claim 16, wherein the visual representation of the fourth classification comprises a confusion matrix.

19. The computer-implemented method of claim 15, wherein one or more of the trained first machine learning model, the trained second machine learning model and the trained third machine learning model are trained to accurately classify text documents within a threshold accuracy level.

20. The computer-implemented method of claim 19, wherein the threshold accuracy level comprises 90%.

\* \* \* \* \*